UNITED STATES PATENT OFFICE.

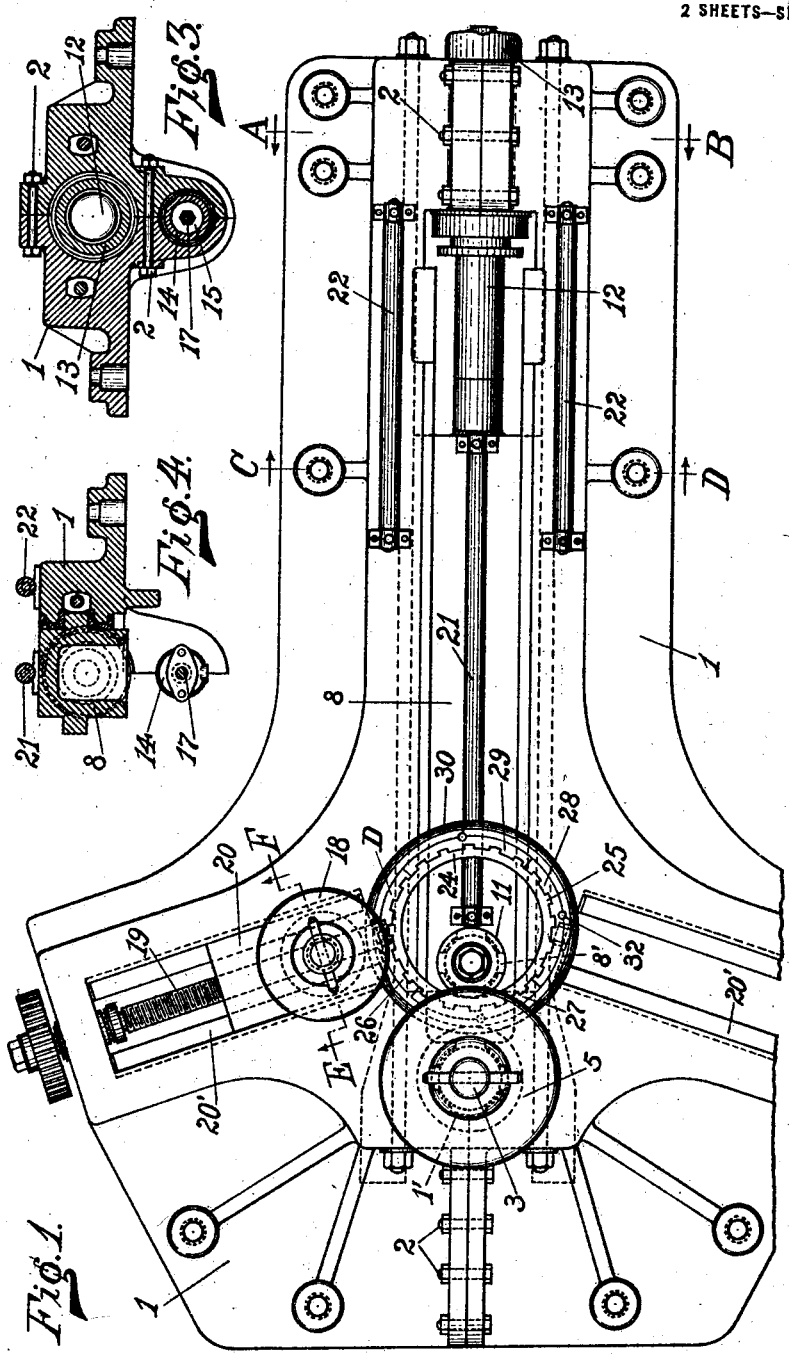

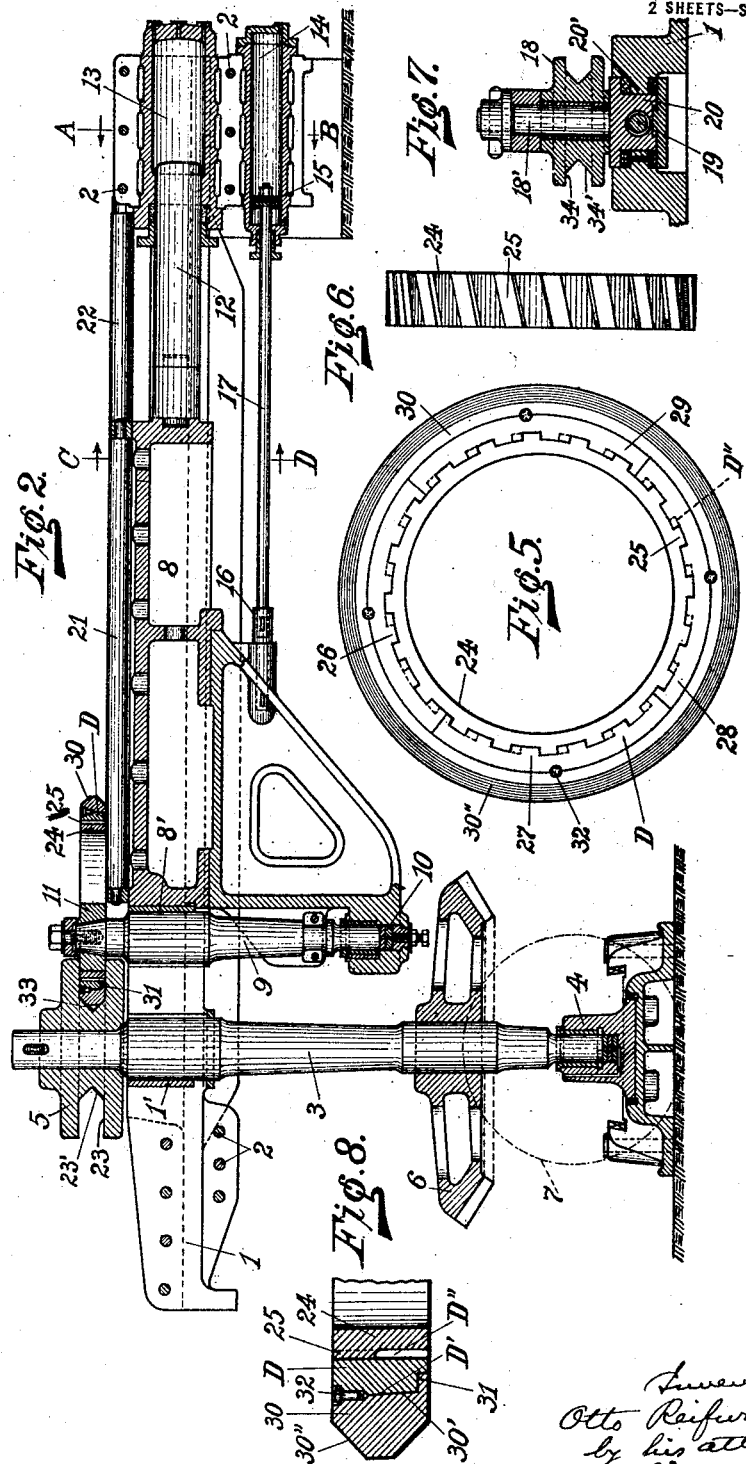

OTTO REIFURTH, OF BOCHUM, GERMANY.

APPARATUS FOR ROLLING TIRES.

1,406,895. Specification of Letters Patent. Patented Feb. 14, 1922.

Application filed August 2, 1916. Serial No. 112,876.

*To all whom it may concern:*

Be it known that I, OTTO REIFURTH, a subject of the King of Prussia, and resident of Bochum, in the Kingdom of Prussia, Empire of Germany, engineer, have invented certain new and useful Improvements in Apparatus for Rolling Tires, of which the following is a specification.

My present invention relates to an apparatus for rolling tires the circumferential face of which is furnished with straight ribs, angle-ribs, warts or any other projections, such as for instance used on wheels of traction-engines, freight-automobiles and similar vehicles. These projections are produced upon the peripheral face of the tire by the aid of recesses sunk into the internal face of a detachable multipartite forming-die and therefore must be arranged to be conveniently subdivided to accommodate themselves to the number of die-sections employed. In doing so, the removal of the finished tire from the die is made possible and easily executable notwithstanding the fact, that at the close of the rolling-process the tire-projections completely fill the recesses of said forming-die. During the rolling-process the sections of the multipartite forming-die are held together by a likewise detachable revoluble casing which on being revolved imparts rotary motion to said forming-die. The internal face of said casing forms a conical seat for the correspondingly shaped external face of the forming-die, thus assuring a correct position of the latter during the rolling-process and an easy and quick removal of the die containing the finished tire from said casing after the rolling-process has been accomplished.

My present invention therefore offers the important advantage that tires provided with projections can be produced in a multipartite forming-die by means of a simple rolling-process and leave the die in a state of finish making all subsequent finishing-work superfluous, i. e., ready for immediate use. This is a feature of very eminent technical and economical importance, since thus it is made possible to cheaply manufacture tires of the kind indicated above, or other similar annular articles, from steel containing a very high percentage of manganese, which element, when present in steel, makes a tool-finishing of articles made of such steel almost impossible, as is well known.

In the accompanying drawings:—

Figure 1 is a plan-view of my improved apparatus.

Figure 2 is a longitudinal elevation of said apparatus taken on the line of junction of the base-halves, mostly in section.

Figure 3 is a sectional view taken on line A—B of Figure 1, or Figure 2.

Figure 4 is a partial sectional view taken on line C—D of Figure 1, or Figure 2.

Figure 5 is a plan-view of a finished tire still embedded in the multipartite forming-die seated in its annular casing.

Figure 6 is a side-elevation of the liberated finished tire.

Figure 7 is a sectional elevation of a guide-roll taken on line E—F of Figure 1.

Figure 8 is a cross-sectional view of tire, die and rotatable annular casing.

The halves of the elongated base 1 are connected by means of the bolts 2 and sustain the main-bearing 1' of the power-driven shaft 3, the lower end of which is journaled in a step-bearing 4 (Figure 2). Said shaft 3 is crowned by a driving pressure-roll 5 and carries between its bearings a conical wheel 6 meshing with a similar wheel 7 indicated in Figure 2 by a dotted circle only.

In the base 1 a pressure-head 8 is slidingly arranged and carries a counter-shaft 9 longitudinally adjustably supported by a step-bearing 10 and journaled in the bearing 8' provided on the front-end of said pressure-head (Figures 1 and 2). This counter-shaft 9 carries a counter-pressure-roll 11, which in conjunction with said pressure-head 8 stands under the influence of a plunger 12 operating in a cylinder 13 and adapted to be actuated therein by any suitable pressure-medium as water, steam and the like. According to Figure 3 the cylinder 13 is held in position by the halves of the base 1 and below it an auxiliary cylinder 14 is sustained in a similar manner. The cylinder 14 contains a piston 15 attached to said pressure-head 8 by the aid of a socket 16 and the piston-rod 17. The object of said piston is to retract said pressure-head after each rolling-operation. At each side of said pressure-rolls 5 and 11 a guide-roll 18 is arranged which by means of a power-driven spindle 19 and a slide-block 20 may be readily adjusted to suit the diameter of the work-piece under consideration. The slide-blocks 20 carrying said guide-rolls on pintles 18' are guided on guide-ways 20' preferably arranged to operate said guide-rolls along lines forming acute angles with the centerline of said elongated base and intersecting said centerline in front of the driving pressure-roll 5, as will readily appear from Figure 1. Only one of said guide-rolls 18 and the means for adjusting it are shown in the upper part of Figure 1, whereas in the lower part of said figure only a part of a guide-way 20' has been indicated. The top-side of the pressure-head 8 carries a sustaining-roll 21 of considerable length, whereas laterally thereof other but shorter sustaining-rolls 22 are arranged upon the base 1 in a manner to partly overlap said sustaining-roll 21 (Figure 1). The object of this arrangement of rolls is to sustain work-pieces of any diameter in the horizontal plane opposite said pressure-rolls and to facilitate the circular motion of said work-pieces during the rolling-process.

Between the pressure-roll 5, provided with a peripheral guide-groove 23, and the counter-pressure-roll 11 lies the work-piece 24, in the present instance a tire having just attained its final shape (Figures 1 and 2). According to Figures 1, 2, 5, 6 and 8 the peripheral face of the tire is provided with ribs 25 arranged on a slant, best indicated in Figure 6. These ribs may, of course, be replaced by any other kind of projections if so desired. In Figures 1, 2, 5 and 8 the finished tire is represented as being still embedded in the detached multipartite forming-die D, in the present instance built up, by way of example, of the four sections 26, 27, 28 and 29. The number of die-sections may, however, be varied as circumstances or the particular shape of the tire-projections may demand it. These die-sections are firmly held together by a likewise detachable annular casing 30 provided with an internal conical or upwardly flaring face or seat 30' with which the correspondingly shaped circumferential face D' of the forming-die D (Figure 8) forms an intimate contact and yet permits of an easy and quick separation of die and casing when required. The advantages of these features are still further improved by means of the annular rib 31 which prevents a jamming of the die within said conical seat 30' and assures an exact alignment of the die-sections in the horizontal plane. The pintles 32 are provided to successfully prevent the creeping of the die-sections in said casing during the rolling-process, whenever such tendency may arise. In order to assure at all times a sure grip of the pressure-roll 5 upon the V-shaped driving-face 30" of the casing 30 said driving-face has been truncated (Figures 2 and 8), whereas the V-shaped driving-bottom 23' of the guide-groove 23 retains its angular shape (Figure 2). By means of this measure the sure grip of the driving pressure-roll 5 on the casing 30 will not be relaxed even when the driving-face 30" has suffered through wear and tear. The triangular space 33 produced by the truncation of the driving-face 30" will, of course, gradually diminish as wear and tear alter the driving-face 30" and the driving-bottom 23' coacting therewith.

The operation of my improved apparatus is as follows:—

After the pressure-head 8 has been sufficiently retracted by means of the piston 15 a casing 30, adapted to receive the forming-die necessitated by the work in hand, is partially introduced into the guide-groove 23 of the pressure-roll 5 and if deemed necessary into the guide-grooves 34 of the guide-rolls 18 too, whereas the roll 21 alone, or in combination with the rolls 22, sustains said casing opposite the pressure-roll 5. Into the casing 30 thus sustained the die-sections are inserted and properly located therein by the aid of the pintles 32. Next the driving-face 30" of the casing 30 is brought into contact with the driving-bottom 23' of the pressure-roll 5, whereupon the guide-rolls 18 are adjusted to bring their V-shaped bottoms 34' likewise into touch with said driving-face 30" and thus assure the central position of the casing 30 during the subsequent rolling-process. After this the casing 30 is sufficiently withdrawn to warrant a quick introduction of the heated annular blank of manganese-steel into the forming-die and to prevent an undue cooling-off of said tire. To the same end also the external diameter of the blank is held somewhat smaller than the internal diameter of the forming-die in order to initiate the rolling-process under the most favorable conditions. It is, of course, possible to execute these preparatory steps in another succession than indicated above.

After the blank has been introduced into the die D the plunger 12 is set under pressure to compel the counter-pressure-roll 11 to press the blank against the recessed internal face of said forming-die and in consequence thereof bring the driving-face 30" of the casing 30 into intimate contact with the driving-bottom 23' of the driving pressure-roll 5. The rolling-process is started by setting the driving-shaft 3 in motion by the aid of the wheels 6 and 7. The pressure-roll 5 thus rotated will immediately impart its motion to the casing 30 which by means of the forming-die will transmit it to said blank and so to the counter-pressure-roll 11.

Since this roll is retained under constant pressure the blank revolving with the die D will be expanded, whereby some of the material of said blank will be forced into the series of recesses D" of the die D and gradually fill them for the formation of the ribs 25. The rolling-process will be continued until the blank is transformed into the desired article of manufacture, i. e., the tire 24 with projections on its face. After the driving pressure-roll 5 has been set at rest and the pressure-medium has been cut off the pressure-roll 11 will be sufficiently retracted by means of the piston 15 to permit the removal of the casing 30 and its contents from the apparatus. To extract the finished tire from the die D the pintles 32 are withdrawn and then the casing 30 is turned upside down and thrown to the ground, whereby the die-sections 26, 27, 28 and 29 embracing the tire 24 will leave their seat in the casing 30 on account of the conicity of the contacting surfaces 30' and D' and readily liberate the tire 24. Since during the entire rolling-process the parts 30, D and 11 intimately cooperate with each other within the guide-groove 23 of the pressure-roll 5 (Figure 2) the tire is ready for immediate use on leaving said die-sections, inasmuch as all its parts are finished in every detail.

It is evident that the peripheral face as well as the cross-section of the annular body of the tire shown might be altered at will by employing dies provided with recesses shaped to produce the desired new outlines of such tire-projections, and by giving the counter-pressure-roll contours adapted to impart any particular cross-section to the tire-body.

I claim:—

1. An apparatus of the character described, comprising a base, a power-driven pressure-roll journaled in said base, a detached multipartite forming-die internally recessed and adapted to be revolved by said power-driven pressure-roll, a pressure-head slidingly arranged in said base, a counter-pressure-roll journaled in said pressure-head opposite said power-driven pressure-roll, and means for operating said pressure-head to cause a relative approach of said pressure-rolls during the rolling-process.

2. An apparatus of the character described, comprising an elongated base, a power-driven pressure-roll stationarily journaled in said base, a detached annular casing adapted to be rotated by said power-driven pressure-roll, a multipartite forming-die sustained by said detached casing and provided with a series of recesses sunk into the internal die-face, a pressure-head slidingly arranged in said base, a counter-pressure-roll journaled in said pressure-head opposite said power-driven pressure-roll, means for operating said pressure-head to cause a relative approach of said pressure-rolls during the rolling-process, and rotary guiding-means arranged laterally of said pressure-rolls.

3. An apparatus of the character described, comprising an elongated base, a power-driven shaft vertically journaled in said base, a driving pressure-roll crowning said shaft, a detached annular casing adapted to be rotated by said driving pressure-roll, a multipartite forming-die seated in said casing and provided with a series of recesses sunk into the internal die-face, a pressure-head slidingly arranged in said base, a counter-pressure-roll journaled in the end of said pressure-head adjacent to said driving pressure-roll, primary means for advancing said pressure-head and said counter-pressure-roll under constant pressure towards said driving pressure-roll, auxiliary means for retracting said pressure-head, slide-blocks arranged in said base laterally of said pressure-rolls, and guide-rolls revolubly mounted on said slide-blocks.

4. An apparatus of the character described, comprising an elongated longitudinally divided base, a vertical driving-shaft journaled at its upper end in said base, means for sustaining the lower end of said shaft, a driving pressure-roll crowning said shaft and provided with a peripheral guide-groove, a detached annular casing adapted to enter said guide-groove to be revolved by said driving pressure-roll, a multipartite forming-die seated in said casing and provided with a series of recesses sunk into the internal die-face, a pressure-head slidingly arranged in said base, a counter-shaft journaled vertically in the end of said pressure-head opposing said driving-shaft, a counter-pressure-roll crowning said counter-shaft and adapted to enter into said guide-groove, a plunger for advancing said pressure-head towards said driving-pressure-roll, a piston for retracting said pressure-head, slide-blocks adjustably guided in said base laterally of said pressure-rolls, and guide-rolls revolubly mounted on said slide-blocks and provided with guide-grooves adapted to receive said casing and die.

5. An apparatus of the character described, comprising an elongated base, a vertical driving-shaft journaled at its upper end in said base, a step-bearing for retaining the lower end of said shaft, a driving pressure-roll removably secured to the upper end of said driving-shaft and provided with a V-bottomed peripheral guide-groove, a detached annular casing provided with a V-shaped external face adapted to operate in said V-bottomed guide-groove, a multipartite forming-die seated in said casing and provided with a series of recesses sunk into the internal die-face, a pressure-head slidingly arranged in said base, a longitudinally adjustable counter-shaft journaled in the end of said pressure-head opposing said driving-shaft, a counter-pressure-roll mounted on said counter-shaft and adapted to enter the guide-groove of said driving pressure-roll, means for operating said pressure-head to cause a relative approach of said pressure-rolls during the rolling-process, means for retracting said pressure-head, slide-blocks adjustably mounted in said base sidewise of said pressure-rolls and adapted to approach the center-line of said base or recede therefrom on lines intersecting each other on said center-line, a guide-roll revolubly mounted on each slide-block and provided with a V-bottomed peripheral guide-groove for receiving said annular casing, and a sustaining-roll journaled on top of said pressure-head.

6. An apparatus of the character described, comprising a base, a vertical driving-shaft stationarily journaled in said base, a driving pressure-roll carried by said shaft and provided with a peripheral guide-groove furnished with a V-shaped driving-bottom, a detached annular casing provided with a truncated V-shaped driving-face adapted to cooperate with said V-shaped guide-groove-bottom for causing the rotation of said casing, an upwardly flaring seat terminating at its lower edge in an annular supporting-rib arranged upon the internal face of said casing, a multipartite forming-die snugly fitting said seat and provided with a series of recesses sunk into the internal die-face, means for preventing the creeping of said die in said casing, a pressure-head slidingly arranged in said base, a counter-shaft journaled in said pressure-head, a counter-pressure-roll carried by said counter-shaft on a level permitting it to enter the V-bottomed guide-groove of said driving pressure-roll, means for causing a relative approach of said pressure-rolls during the rolling-process, means for retracting said pressure-head after completing said rolling-process, slide-blocks adjustably guided in said base on lines forming acute angles with the center-line of said base and intersecting said center-line at a point in advance of said driving pressure-roll, guide-rolls mounted on said slide-blocks and provided with a peripheral guide-groove furnished with a V-shaped bottom and adapted to receive and sustain said casing and said die, a sustaining-roll journaled on said pressure-head, and sustaining rolls journaled on said base on a level with said pressure-head sustaining-roll.

Signed by me at Barmen, Germany, this 8th day of July, 1916.

OTTO REIFURTH. [L. S.]

Witnesses:
 HELEN NUFER,
 FRANCES NUFER.